(12) United States Patent
Wolf

(10) Patent No.: US 6,416,229 B1
(45) Date of Patent: Jul. 9, 2002

(54) BALL BEARING

(75) Inventor: Martin Wolf, Ansbach (DE)

(73) Assignee: INA Walzlager Schaeffler oHG (DE)

( * ) Notice: Subject to any disclaimer, the term of this patent is extended or adjusted under 35 U.S.C. 154(b) by 53 days.

(21) Appl. No.: 09/711,057

(22) Filed: Nov. 10, 2000

(30) Foreign Application Priority Data

Nov. 19, 1999 (DE) .......................................... 199 55 643

(51) Int. Cl.[7] .......................... F16C 33/58; F16C 27/06
(52) U.S. Cl. ........................................ 384/516; 384/536
(58) Field of Search ................................... 384/513, 514, 384/515, 516, 536, 538, 518, 476; 280/775, 777, 779; 74/492, 493

(56) References Cited

U.S. PATENT DOCUMENTS

| | | | | |
|---|---|---|---|---|
| 3,805,934 A | * | 4/1974 | Labadie ...................... | 384/513 |
| 4,979,834 A | * | 12/1990 | Speich ........................ | 384/510 |
| 5,002,404 A | * | 3/1991 | Zernickel et al. ........... | 384/448 |
| 5,538,282 A | * | 7/1996 | White et al. ................ | 208/775 |
| 5,826,987 A | * | 10/1998 | Beaman ....................... | 384/517 |
| 5,975,766 A | * | 11/1999 | Cau ............................ | 384/518 |
| 6,179,473 B1 | * | 1/2001 | Ponson et al. .............. | 384/517 |

FOREIGN PATENT DOCUMENTS

| | | |
|---|---|---|
| DE | 418317 | 9/1925 |
| DE | 1259148 | 6/1962 |
| DE | 7013862 | 7/1970 |
| DE | 8216541 | 6/1982 |
| DE | 3808556 | 9/1989 |
| DE | 3831769 | 3/1990 |
| DE | 4003052 | 8/1991 |
| DE | 4114643 | 11/1992 |
| DE | 29910681 | 10/1999 |

OTHER PUBLICATIONS

Industrie–Anzeiger article, Oct. 3, 1961, Nr. 79 pp. 624–627.

* cited by examiner

*Primary Examiner*—Thomas R. Hannon
(74) *Attorney, Agent, or Firm*—Bierman, Muserlian and Lucas

(57) ABSTRACT

An angular contact ball bearing is configured so that the inner bearing ring (6) comprises two spaced apart points of contact, B and C, and the outer bearing ring comprises one point of contact A, the point of contact C of the inner bearing ring (6) being formed only after a tilting of the inner bearing ring (6). Due to this third point of contact C, a tilting of the inner bearing ring is almost completely prevented.

9 Claims, 3 Drawing Sheets

BALL BEARING

FIELD OF THE INVENTION

The present invention relates to an angular contact ball bearing, and in particular to an angular contact ball bearing for mounting a steering shaft of an automotive vehicle, said bearing comprising an inner bearing ring, an outer bearing ring and bearing balls arranged between the inner and outer bearing rings, the inner bearing ring being received by an elastic tolerance ring of a polymeric material comprising radially outward directed retaining lugs that engage around the inner bearing ring so that an inseparable assembly is formed.

BACKGROUND OF THE INVENTION

Such angular contact ball bearings support axial forces only in one direction and therefore have to be placed against a second bearing. These bearings are preferentially used as steering bearings because they have only a small moment of friction and a relatively high rigidity while being simple to mount and economic as well.

One such angular contact ball bearing of the pre-cited type as frequently used for the mounting of steering shafts is known from DE 38 08 556 A1. The inner ring of this bearing is received by a plastic tolerance ring which engages around the inner ring by a radial projection. At the other axial end of the inner ring, there is arranged a spring element in the form of a spring washer that is retained in the tolerance ring by a locking washer which is likewise secured in the tolerance ring by a radially inward directed projection. In this way, a pre-stressed assembly is formed out of the rolling bearing and the retaining and tensioning elements. Thus a single component is obtained that can be pre-assembled by simple axial slipping-on during assembly.

Such angular contact ball bearings have the drawback that if the pressure angle is large i.e., if there exists an optimal combination of the moment of friction and the basic load rating with a tolerance ring having a small clamping angle with which a maximum angle of axial fixing of the steering shaft and a stiff spring characteristic of the steering are realized, a critical range is produced in the spring characteristic of the steering at low loads. This results in that, in the range of 10% of the maximum load, the steering already effects a turn of almost 30% of the maximun steering angle due to a tilting of the inner bearing ring.

OBJECTS OF THE INVENTION

It is therefore an object of the invention to provide an angular contact ball bearing with an increased resistance to a tilting of the inner bearing ring.

This and other objects and advantages of the invention will become obvious from the following detailed description.

SUMMARY OF THE INVENTION

The invention achieves the above objects by the fact that the inner bearing ring comprises two spaced apart points of contact, B and C, and the outer bearing ring comprises one point of contact A, and the point of contact C of the inner bearing ring is formed only after a tilting of the inner bearing ring has taken place.

A bearing configured according to the invention has a stiffer spring characteristic because the tilting of the inner bearing ring is almost completely eliminated. This is effected by the second point of contact C of the inner bearing ring which, however, comes into contact with the bearing ball only when a tilting of the inner bearing ring takes place. If the inner bearing ring does not tilt, the bearing of the invention behaves like a normal angular contact ball bearing i.e., only the two diagonally opposed points of contact, A and B, exist between the bearing ball and the bearing rings.

According to one advantageous feature of the invention, the angular contact ball bearing has a pressure angle of 40° to 50° and a clamping angle of 15° to 25°. The stated pressure angle results in an optimal combination of the moment of friction and the basic load rating. If the pressure angle is reduced too strongly, not only is the basic load rating increased due to the pre-stress, but also the friction. The stated clamping angle range of the tolerance ring ensures a maximum axial fixing which, in its turn, increases the stiffness of the spring characteristic. The larger the clamping angle, the easier it is for the tolerance ring to be pressed out, so that the point of support between the inner bearing ring and the tolerance ring changes and this results in an undesired radial movement of the bearing.

According to a further feature of the invention, each end of the raceway section of the inner bearing ring merges into an axially extending portion that continues into a radially extending portion. Thus the two radially extending portions and the raceway section assure the formation of an inseparable assembly i.e., the bearing cannot fall apart.

According to still another feature of the invention, the outer bearing ring comprises a step which continues into an axially extending portion of larger diameter that ends in a radially outward directed flange. This division of the outer bearing ring into two parts by the step has a double advantage.

Firstly, when the outer bearing ring is fabricated by drawing, the tool for making the outer bearing ring can be matched individually to the shape of the raceway of the bearing balls and to the axially extending portion of the outer bearing ring. This has the positive effect on the bearing that any desired osculation can be achieved without regard to the axially extending portion i.e., independently of the outer diameter. Secondly, there is no negative effect on the raceway of the bearing balls when the angular contact ball bearing is pressed into the stationary steering tube with large tolerances because pressing-in is effected only with the axially extending portion of larger diameter.

According to another feature of the invention, the bearing rings of the angular contact ball bearing are made by shaping without chip removal. It is quite obvious that bearing rings can be manufactured very economically by this manufacturing technology.

According to still another feature of the invention, the retaining lugs of the tolerance ring engage around the inner bearing ring in a region of the raceway section that includes the points of contact B and C and is bent inwardly into a concave shape. In accordance with a further feature of the invention, the tolerance ring is divided into a number of segments by incisions so that it is possible to assemble the complete assembly without any problem by snapping.

According to still another feature of the invention, the retaining lugs of the tolerance ring merge into an axially extending first portion of the tolerance ring which continues into a second portion that ascends at a clamping angle β, a vertex of the inwardly bent concave raceway section of the inner bearing ring being arranged in the transition between the first and the second portion of the tolerance ring. This configuration of the tolerance ring assures a secure axial fixing.

Finally, according to still another feature of the invention, the tolerance ring of the angular contact ball bearing is made of a polymeric material that can conduct electric current. In this way, electric current for actuating the signal horn or for releasing the airbag can be conducted from the steering shaft to the steering tube through the rolling bearing. For this purpose, the electric conductivity of the polymeric material is raised to match that of a metal. This is achieved, for example, by adding carbon or steel fibers or soot particles to the polymeric material. This has the advantage that the conductivity of the tolerance ring exists already during the fabrication process so that an after-treatment of the finished plastic component is not required. The conductivity of the polymeric material can, however, also be established by a metallic coating that may be deposited by galvanic, chemical or PVD methods. Galvanic methods require a conducting layer to be deposited on the plastic after this has been cleaned and roughened, deposition of the metal being effected in the form of ions from watery solutions by the application of an electric tension. In chemical or currentless metallizing, as known, metal ions are precipitated from a salt solution by reducing agents. By PVD methods, a person skilled in the art understands coating methods based on the principle of "Physical Vapor Deposition" i.e., the coatings are produced by the precipitation of atoms or molecules out of the gaseous phase.

The invention will now be described more closely with reference to an example of embodiment illustrated in the appended drawings.

DETAILED DESCRIPTION OF THE DRAWINGS

Figure 1:
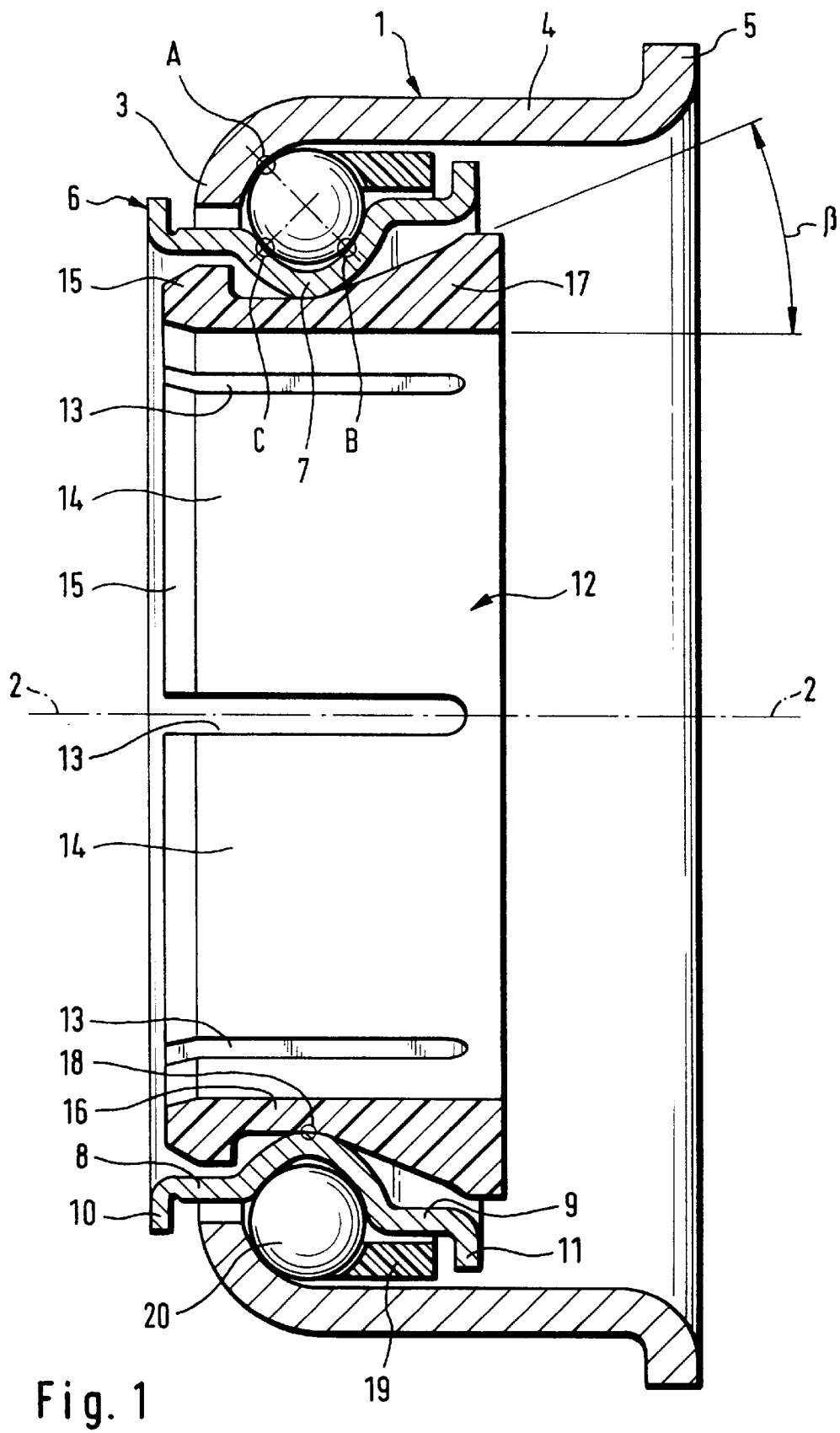
FIG. 1 is a longitudinal cross-section through an angular contact ball bearing of the invention.
Figure 2:
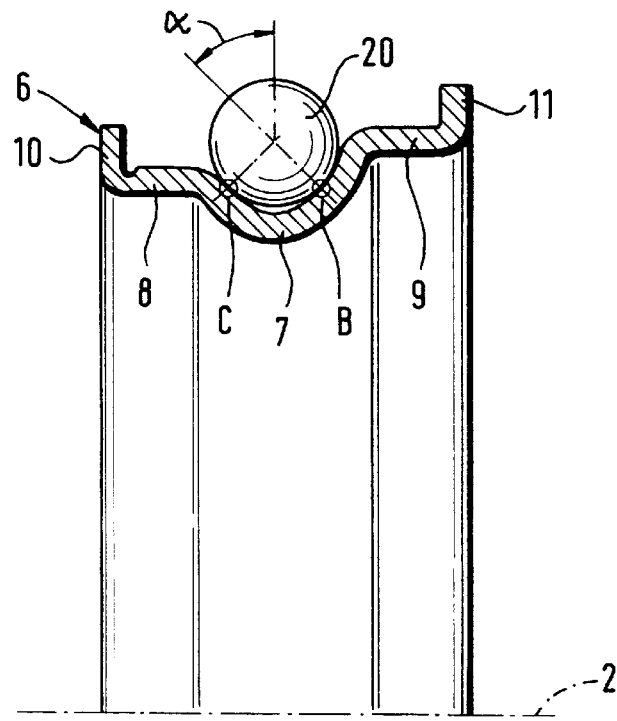
FIG. 2 is a partial longitudinal cross-section through an inner bearing ring of the bearing of the invention.
Figure 3:
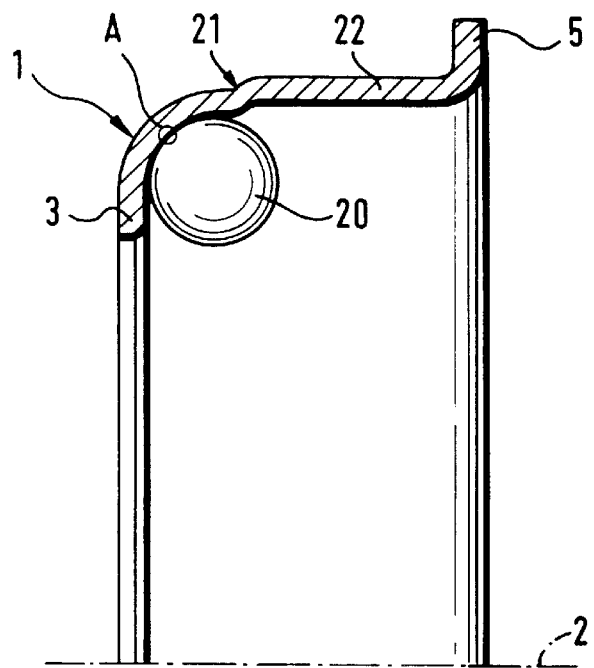
FIG. 3 is a partial longitudinal cross-section through an outer bearing ring of the bearing of the invention.

The angular contact ball bearing illustrated in FIGS. 1 to 3 comprises a chiplessly drawn outer bearing ring I which has a portion 3 extending substantially radially to its axis of rotation 2, and a portion 4 that extends substantially parallel to the axis of rotation 2. At its right end, the axially extending portion 4 merges into a radially outward directed flange 5. The inner bearing ring 6 is likewise made without chip removal and comprises the radially inward curved raceway section 7 which continues on both sides into axially extending portions 8 and 9, the diameter of the portion 9 being larger than the diameter of the portion 8. The portions 8 and 9 end in radially extending portions 10 and 11 respectively. The inner bearing ring 6 is received by the tolerance ring 12 that is divided into a plurality of segments 14 by a plurality of circumferentially equi-spaced incisions 13. The tolerance ring 12 comprises radially outward directed retaining lugs 15 and an axially extending first portion 16 that merges into a second portion 17 that ascends at a clamping angle β. The retaining lugs 15 of the tolerance ring 12 overlap the raceway section 7 of the inner bearing ring 6, while the radially extending portions 10 and 11 of the inner bearing ring 6 surround the radially extending portion 3 of the outer bearing ring 1 and a cage 19 of the bearing balls respectively. In this way, an inseparable assembly is formed i.e., the individual components of the bearing cannot be separated from one another by axial displacement.

As further shown in FIGS. 1 to 3, the angular contact ball bearing has three points of contact, A, B and C, the point of contact A being formed by the bearing balls 20 and the outer bearing ring 1, and the points of contact B and C by the bearing balls 20 and the inner bearing ring 6. The angular contact ball bearing of the invention is configured so that, in its non-tilted state, it is a normal angular contact bearing with the two points of contact A and B. If the steering column, not shown, which is lodged in the tolerance ring 12, causes the inner bearing ring 6 to tilt, the point of contact C situated in the raceway section 7 of the inner bearing ring 6 comes into contact with the bearing balls 20. In this way, tilting is almost completely prevented due to the fact that the angular contact ball bearing then becomes a three-point angular contact ball bearing.

In the outer bearing ring 1 shown in FIG. 3, the raceway section, i.e., the point of contact A is followed by a step 21 that merges into a portion 22 extending parallel to the axis of rotation 2, the diameter of the portion 22 being larger than the diameter of the step 21. If such an outer bearing ring 1 is pressed into a steering tube, not shown, it is obvious that, if large tolerances exist, the raceway for the bearing balls 20 cannot be adversely affected during pressing-in because this is done only with the portion 22.

Figure 4:
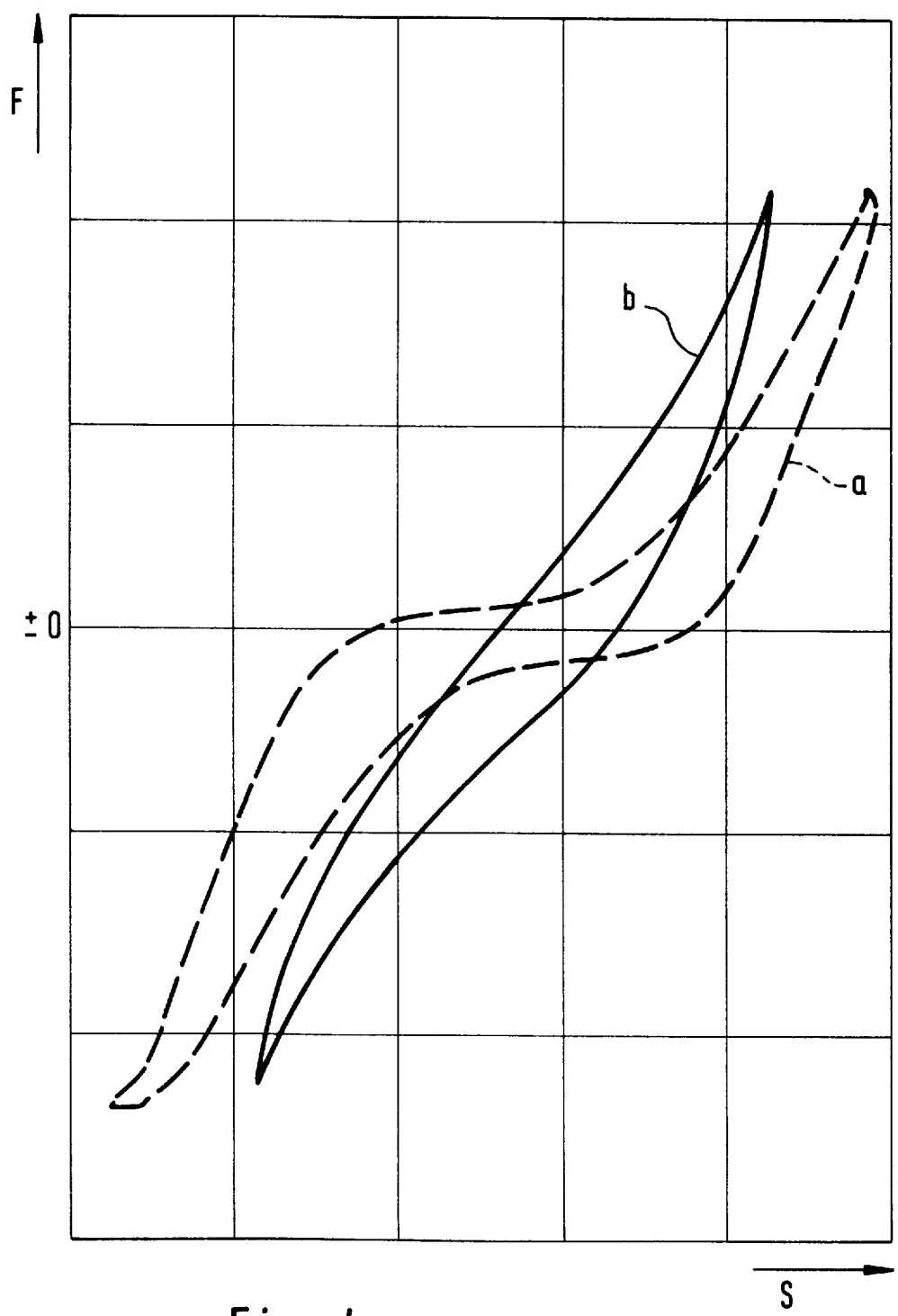
FIG. 4 is a characteristic curve of radial displacement

FIG. 4 shows the characteristic curves of radial displacement i.e., the states of displacement of two bearings under radial load, "a" showing the loaded and unloaded states of a convention angular contact ball bearing and "b", the loaded and unloaded states of a bearing of the invention. It can be clearly seen that particularly at low loads (spring force "F" of the spring characteristic), the radial displacement (spring excursion "s" of the spring characteristic) of the bearing "a" is larger than the radial displacement of the bearing of the invention "b" i.e., the inner bearing ring 6 of the bearing of the invention "b" is subjected to less tilting than the inner ring of the bearing "a".

What is claimed is:

1. An angular contact ball bearing for mounting a steering shaft of an automotive vehicle, said bearing comprising an inner bearing ring, an outer bearing ring and bearing balls arranged between the inner and outer bearing rings in rolling contact with raceways formed on the inner and outer bearing rings, the inner bearing ring being received by an elastic tolerance ring of a polymeric material comprising radially outward directed retaining lugs that engage around the inner bearing ring so that an inseparable assembly is formed, wherein the inner bearing ring comprises two spaced apart points of contact, B and C, and the outer bearing ring comprises one point of contact A, and the point of contact C of the inner bearing ring is formed only after a tilting of the inner bearing ring has taken place.

2. An angular contact ball bearing of claim 1 wherein a pressure angle α is 40° to 50° and a clamping angle β, is 15° to 25°.

3. An angular contact ball bearing of claim 1 wherein each end of a raceway section of the inner bearing ring merges into an axially extending portion that continues into a radially extending portion.

4. An angular contact ball bearing of claim 1 wherein the outer bearing ring comprises a step which continues into an axially extending region of larger diameter that ends in a radially outward directed flange.

5. An angular contact ball bearing of claim 1 wherein the inner and outer bearing rings are made by shaping without chip removal.

6. An angular contact ball bearing of claim 1 wherein the retaining lugs of the tolerance ring engage around the inner bearing ring in a region of the raceway section that includes the points of contact B and C and is bent inwardly into a concave shape.

7. An angular contact ball bearing of claim 1 wherein the tolerance ring is divided by incisions into a plurality of segments.

8. An angular contact ball bearing of claim 1 wherein the retaining lugs of the tolerance ring merge into an axially extending first portion of the tolerance ring which continues into a second portion that ascends at a clamping angle $\beta$, a vertex of the inwardly bent concave raceway section of the inner bearing ring being arranged in a transition between the first and the second portion of the tolerance ring.

9. An angular contact ball bearing of claim 1 wherein the tolerance ring is made of a polymeric material that can conduct electric current.

* * * * *